No. 758,071. PATENTED APR. 26, 1904.
T. S. HILES.
SIDEWALK CLEANER.
APPLICATION FILED DEC. 26, 1902.
NO MODEL.

Witnesses:
Chas. O. Shervey,
Russell Wiler.

Inventor:
Thomas S. Hiles
by H. S. Bitner
Atty.

No. 758,071. Patented April 26, 1904.

UNITED STATES PATENT OFFICE.

THOMAS S. HILES, OF CHICAGO, ILLINOIS.

SIDEWALK-CLEANER.

SPECIFICATION forming part of Letters Patent No. 758,071, dated April 26, 1904.

Application filed December 26, 1902. Serial No. 136,574. (No model.)

*To all whom it may concern:*

Be it known that I, THOMAS S. HILES, a citizen of the United States of America, residing at Chicago, in the county of Cook and State of Illinois, have invented certain new and useful Improvements in Sidewalk-Cleaners, of which the following is a specification.

My invention relates to certain new and useful improvements in sidewalk-cleaners; and its object is to produce a device which will serve more satisfactorily than any of the devices heretofore in use.

To this end my invention consists in certain novel features of construction which are clearly set forth in this specification and illustrated in the accompanying drawings.

Figure 1:
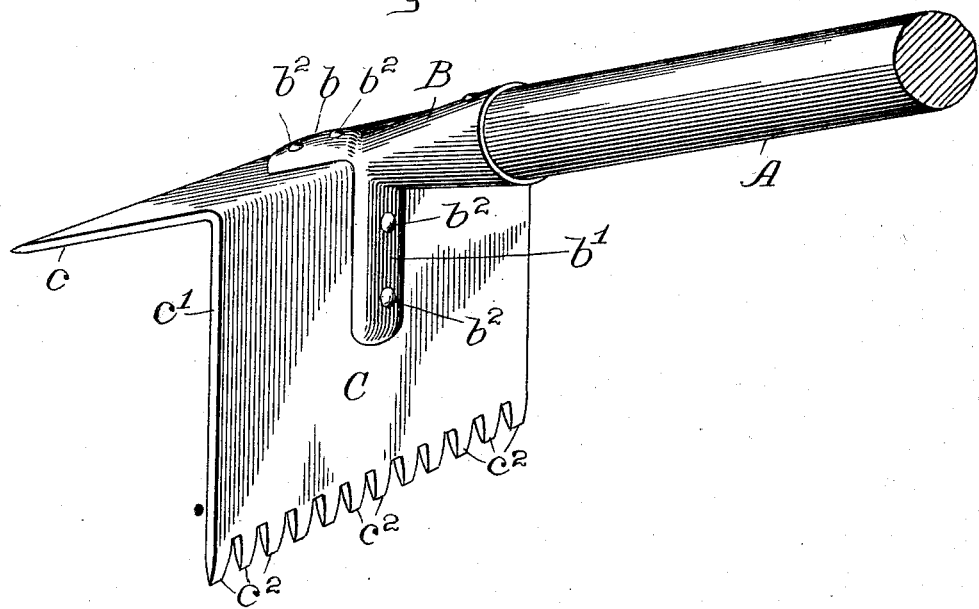
Figure 2:
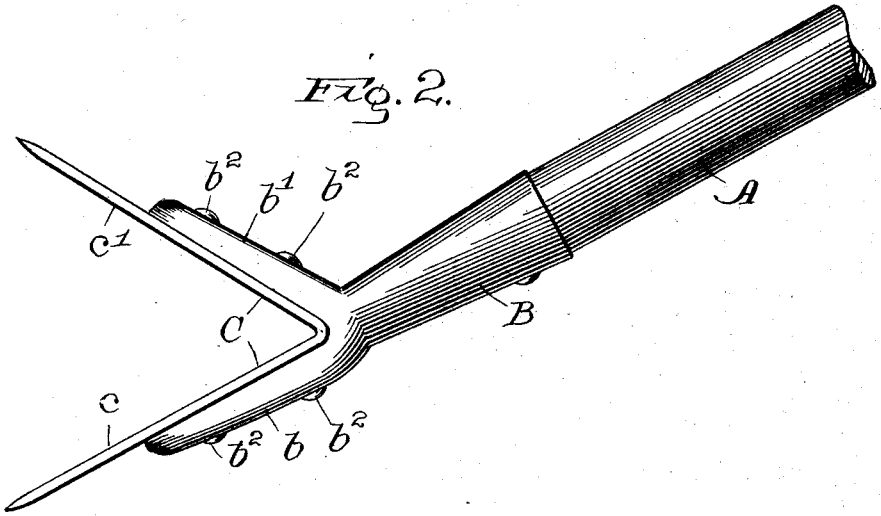

In the accompanying drawings, Figure 1 is a perspective of my improved cleaner, showing it in the position in which it is held for breaking ice; and Fig. 2 is a side elevation of the cleaner, showing it in the position in which it is held when it is used as a shovel.

Referring to the drawings, A is the handle of the sidewalk-cleaner, it being a wooden rod of any desired weight and strength and of any convenient length. To the lower end of the handle A is secured a ferrule B, which is bifurcated at its lower end, one of the furcations, $b$, continuing the line of the handle and the other furcation, $b'$, extending from the line of the handle at an angle of approximately sixty degrees. Between the furcations $b$ $b'$ and secured thereto by suitable rivets $b^2$ is a plate C, approximately eight inches wide, the plate being bent at its middle to form two leaves $c$ $c'$, the leaf $c$ being riveted to the furcation $b$ and the leaf $c'$ being riveted to the furcation $b'$. The lower end of the leaf $c$ has a straight scraping edge, while the lower end of the leaf $c'$ is provided with a plurality of points $c^2$.

In cleaning a sidewalk covered with ice and snow several different sorts of work have to be done, and the different parts of my device suffice to perform all of them. In the first place it is necessary to break up the ice and packed snow. This is done by chopping with the serrated edge of the leaf $c'$. After this is accomplished it is necessary to shovel off the snow and ice, and the leaf $c$ acts as a very efficient snow-shovel, it being backed up by the leaf $c'$, so as to prevent the snow from running over the top of the blade. The leaf $c$ further acts as a scraper to remove small particles of ice and snow from the sidewalk, so that by using the two blades of my improved device all the necessities of the situation can be readily met.

I claim as new and desire to secure by Letters Patent—

1. The combination with a handle, of two leaves meeting at an angle, rigidly secured to the end thereof, one of the leaves lying substantially in line with the handle and the other extending therefrom at an acute angle.

2. The combination with a handle, of a single imperforate rectangular plate bent approximately at its center to form two leaves, rigidly secured to the end thereof, one of the leaves lying substantially in line with the handle and the other extending therefrom at an acute angle.

In witness whereof I have hereunto signed the above application for Letters Patent at Chicago, in the county of Cook and State of Illinois, this 17th day of December, A. D. 1902.

THOMAS S. HILES.

Witnesses:
CHAS. O. SHERVEY,
RUSSELL WILES.